(12) United States Patent
Arnault et al.

(10) Patent No.: US 11,486,474 B2
(45) Date of Patent: Nov. 1, 2022

(54) PULLEY DEVICE FOR A TENSIONING OR WINDING ROLLER

(71) Applicant: Aktiebolaget SKF, Gothenburg (SE)

(72) Inventors: Benoit Arnault, Saint-Cyr-sur-Loire (FR); Gwenael Hingouet, Saint-Cyr-sur-Loire (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 310 days.

(21) Appl. No.: 16/571,493

(22) Filed: Sep. 16, 2019

(65) Prior Publication Data

US 2020/0088274 A1 Mar. 19, 2020

(30) Foreign Application Priority Data

Sep. 18, 2018 (FR) ...................................... 1858379

(51) Int. Cl.
| | | |
|---|---|---|
| *F16H 55/56* | (2006.01) | |
| *F16H 55/48* | (2006.01) | |
| *F16H 55/36* | (2006.01) | |
| *F16H 7/20* | (2006.01) | |
| *F16H 7/12* | (2006.01) | |
| *F16C 33/78* | (2006.01) | |

(52) U.S. Cl.
CPC ......... *F16H 7/1281* (2013.01); *F16C 33/783* (2013.01); *F16C 33/7886* (2013.01); *F16C 33/7896* (2013.01); *F16H 7/20* (2013.01); *F16H 55/36* (2013.01); *F16H 55/48* (2013.01); *F16H 55/56* (2013.01)

(58) Field of Classification Search
CPC .... F16H 2007/0865; F16H 55/36; F16H 7/20; F16C 33/805; F16C 33/784; F16C 33/7816; F16C 33/7886; F16C 33/7896

USPC .................. 474/199, 166; 384/488, 477, 485
See application file for complete search history.

(56) References Cited

U.S. PATENT DOCUMENTS

| | | | | |
|---|---|---|---|---|
| 3,770,992 | A * | 11/1973 | Veglia | F16C 43/045 384/489 |
| 4,025,132 | A * | 5/1977 | Watanabe | F16C 33/805 384/130 |
| 5,517,957 | A * | 5/1996 | Wagner | F16D 41/066 123/192.1 |
| 6,357,926 | B1 * | 3/2002 | Hauck | F16C 33/76 384/546 |

(Continued)

FOREIGN PATENT DOCUMENTS

| | | |
|---|---|---|
| DE | 102007031188 A1 | 1/2009 |
| DE | 102010027112 A1 | 1/2012 |
| JP | 2010078102 A | 4/2010 |

*Primary Examiner* — Gene O Crawford
*Assistant Examiner* — Emily Rose Kincaid
(74) *Attorney, Agent, or Firm* — Garcia-Zamor Intellectual Property Law; Bryan Peckjian; Ruy Garcia-Zamor

(57) ABSTRACT

A Pulley device for a tensioning or winding roller for a transmission element including a pulley, and a rolling bearing provided with a rotating outer ring, the pulley being mounted on an outer surface of the outer ring, a fixed inner ring, the rings being coaxial and forming a radial space between them, and at least one row of rolling elements arranged in the radial space. The pulley device further includes at least one annular protection flange with a radial body. The flange is fixed to the rotating outer ring by crimping an axially protruding portion of the pulley towards an outer edge of the flange.

16 Claims, 3 Drawing Sheets

(56) References Cited

U.S. PATENT DOCUMENTS

| | | | |
|---|---|---|---|
| 2005/0191002 A1* | 9/2005 | Ilie | F16C 33/7886 |
| | | | 384/537 |
| 2007/0072714 A1* | 3/2007 | Filip | F16H 7/20 |
| | | | 474/70 |
| 2008/0268995 A1 | 10/2008 | Sakamoto et al. | |
| 2009/0191999 A1* | 7/2009 | Joseph | F16H 55/36 |
| | | | 384/485 |
| 2011/0039648 A1* | 2/2011 | Lannutti | F16H 7/20 |
| | | | 474/166 |

* cited by examiner

PULLEY DEVICE FOR A TENSIONING OR WINDING ROLLER

CROSS-REFERENCE TO RELATED APPLICATIONS

This application claims priority to French patent application no. 1858379 filed on Sep. 18, 2018, the contents of which are fully incorporated herein by reference.

FIELD OF THE INVENTION

The present invention relates to the field of pulley devices for a tensioning or winding roller provided to cooperate with a transmission element, for example a belt or a distribution or drive train of a motor vehicle internal combustion engine.

BACKGROUND OF THE INVENTION

Such rollers are generally used to permanently maintain a tension on the transmission element within a determined range or to locally modify the path taken thereby. The respective terms tensioning rollers or winding rollers are then used. In the winding rollers, the pulley is mounted to rotate on a screw of threaded body via a rolling bearing, the roller being then fixed directly or indirectly onto the engine block or onto an element of a tensioning roller device, for example an articulated arm or an eccentric.

The rolling bearing generally comprises a fixed inner ring with a bore that is passed through by a screw, a rotating outer ring topped by a pulley, and at least one row of rolling elements inserted between the rings.

Such devices are often equipped with seals, even additional protection flanges, helping to protect the device against pollution or splashing from the external environment.

Particles or other polluting elements can however infiltrate, which can accumulate over time in immediate proximity to the sealing means of the rolling bearing. Since the sealing means can wear, the risk of ingress of the pollution into the rolling chamber increases with the period of use of the pulley device. This internal pollution can cause an accelerated deterioration of the components internal to the rolling bearing, in particular the contact surfaces between the rolling elements and the rings. The result thereof can then be a lowering of the quality of the rotating mechanical link provided by the pulley device, and a reduced lifespan of its internal components. The risk of breakage, in particular in operating mode, is also higher.

BRIEF SUMMARY OF THE INVENTION

The present invention aims to remedy this drawback.

More particularly, the present invention aims to provide a pulley device that is resistant in conditions with high pollution, that is particularly economical, that is easy and safe to mount, and that forms an inseparable subassembly, and has reduced axial and radial bulk.

the invention relates to a pulley device for a tensioning or winding roller for a transmission element comprising a pulley with an outer surface intended to cooperate with the transmission element, and a rolling bearing.

The rolling bearing is provided with a rotating outer ring, the pulley being mounted on an outer surface of the outer ring, a fixed inner ring, the rings being coaxial and forming a radial space between them, and at least one row of rolling elements arranged in the radial space.

The pulley device further comprises at least one annular protection flange with an essentially radial body.

According to the invention, the pulley has at least one portion axially protruding relative to a lateral face of the rotating outer ring, the flange being mounted in a bore of the axially protruding portion. The flange is fixed to the rotating outer ring by crimping the axially protruding portion of the pulley towards an outer edge of the flange.

The outer edge of the flange is thus pinched axially between a crimping portion of the pulley and the rotating outer ring.

By virtue of the invention, an annular protection flange is mounted securely to the pulley device with sufficient concentricity, avoiding the design of complex parts.

The pulley device, and more particularly the radial space between the coaxial rings of the rolling bearing, is protected from the ingress of pollution. The lifespan and the quality of mechanical link ensured by the rolling bearing are thereby enhanced.

According to other advantageous but non-essential features of the invention, such a pulley device can also include the following features, taken alone or with any technically admissible combination:

The flange comes to bear directly against the lateral face of the outer ring.

The axially protruding portion of the pulley is crimped at several locations of the circumference of the outer edge of the flange.

The flange has a bore-forming inner edge that comes into immediate proximity of an outer surface of the fixed inner ring.

The inner ring of the rolling bearing is made of a single piece.

The inner ring of the rolling bearing comprises a track element provided with an outer surface suitable for the rolling elements, and a spacer provided with an outer surface mounted in a bore of the track element.

A cage ensures that the circumferential spacing of the rolling elements is maintained.

The rolling elements are balls.

The pulley device further comprises rear and front sealing means closing the radial space on each axial side.

The pulley is made of metal, for example of steel.

The pulley is made of plastic material, for example of polyamide.

The pulley is formed by overmoulding plastic material onto the outer ring of the rolling bearing.

The flange is made of metal, for example of steel.

The flange is made of plastic material, for example of polyamide.

BRIEF DESCRIPTION OF THE SEVERAL VIEWS OF THE DRAWING

The invention will be better understood on reading the following description which is given purely as a nonlimiting example.

The description is given with reference to the attached drawings in which.

DETAILED DESCRIPTION OF THE INVENTION

Figure 1:
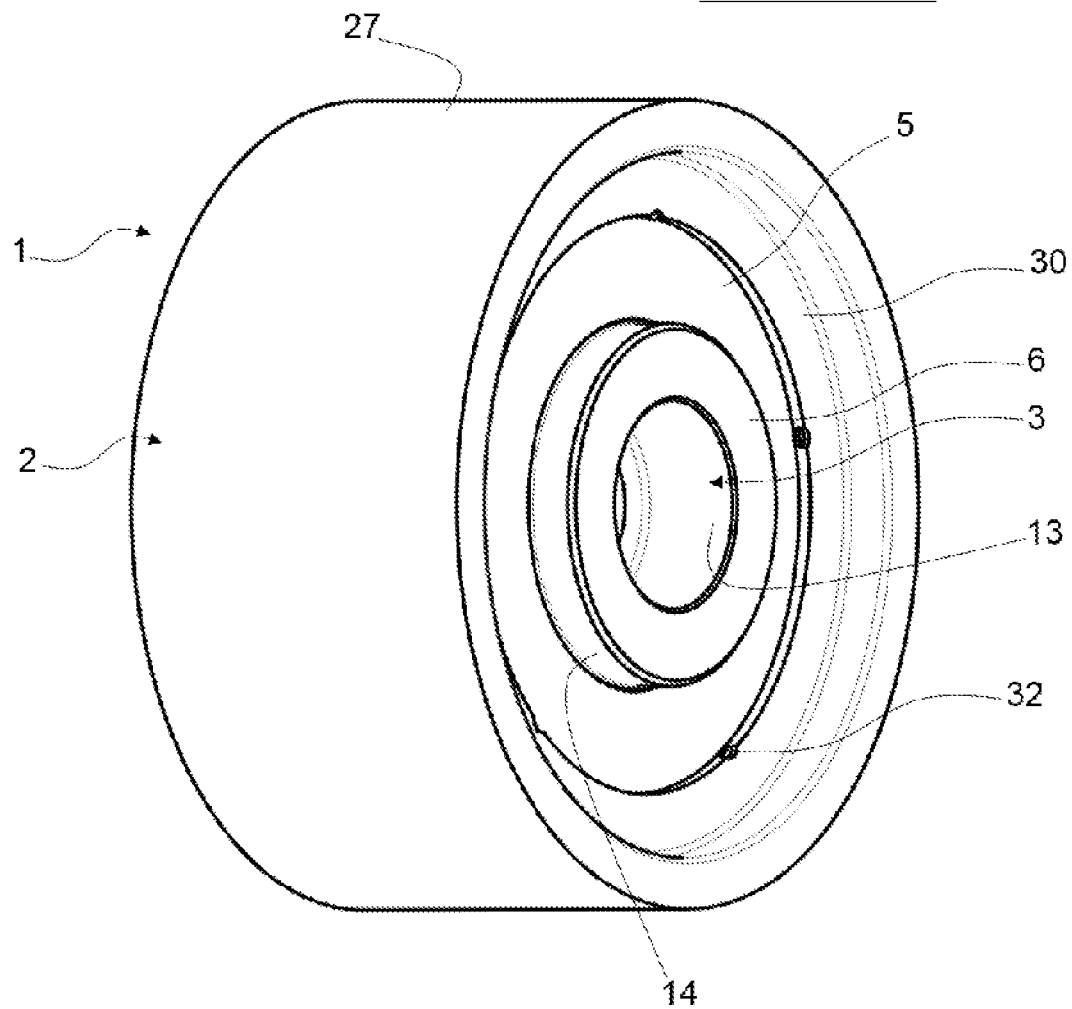
FIG. 1 is a perspective view of a pulley device according to an embodiment of the invention.
Figure 2:
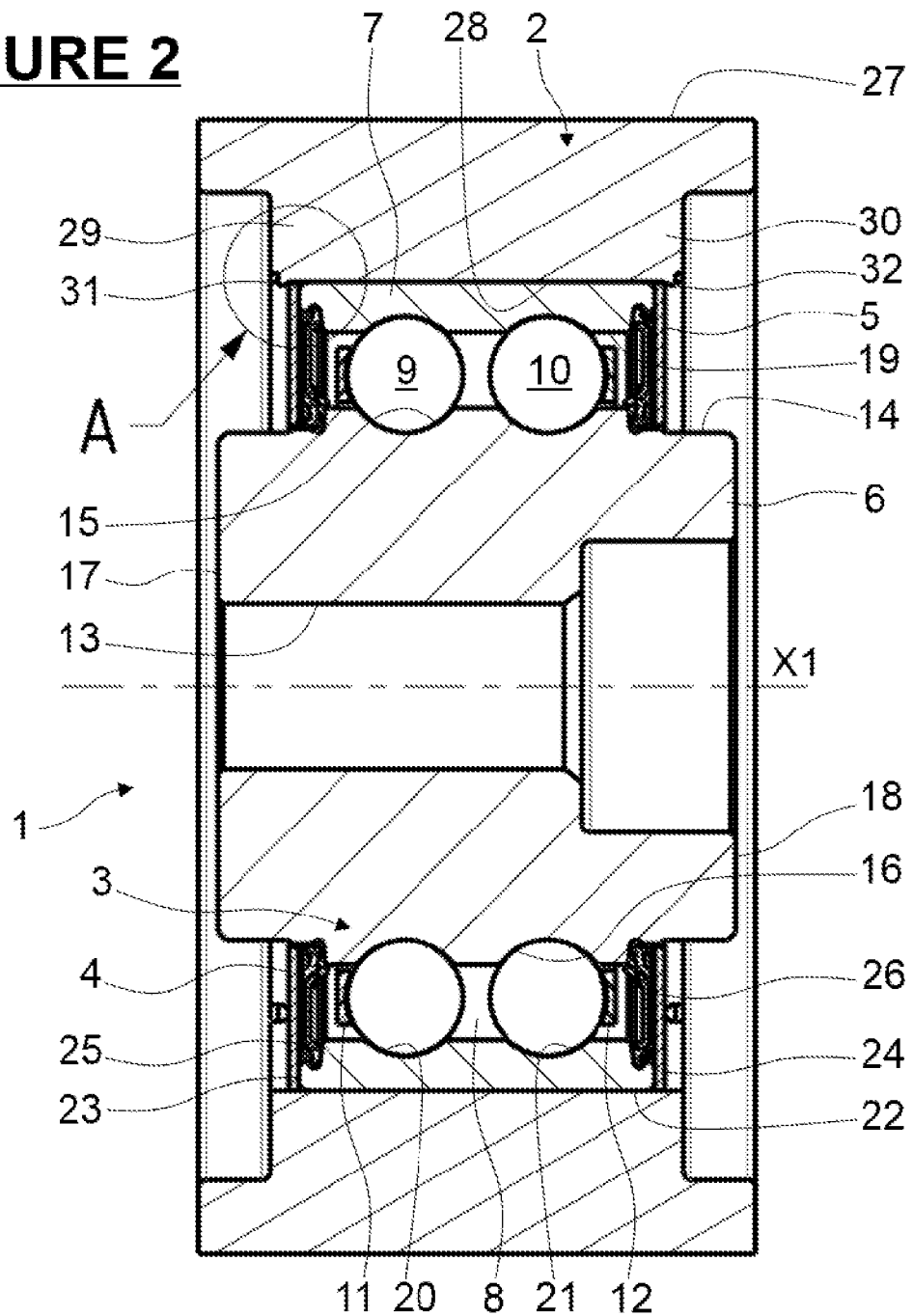
FIG. 2 is a view in axial cross section of the pulley device of FIG. 1.
Figure 3:
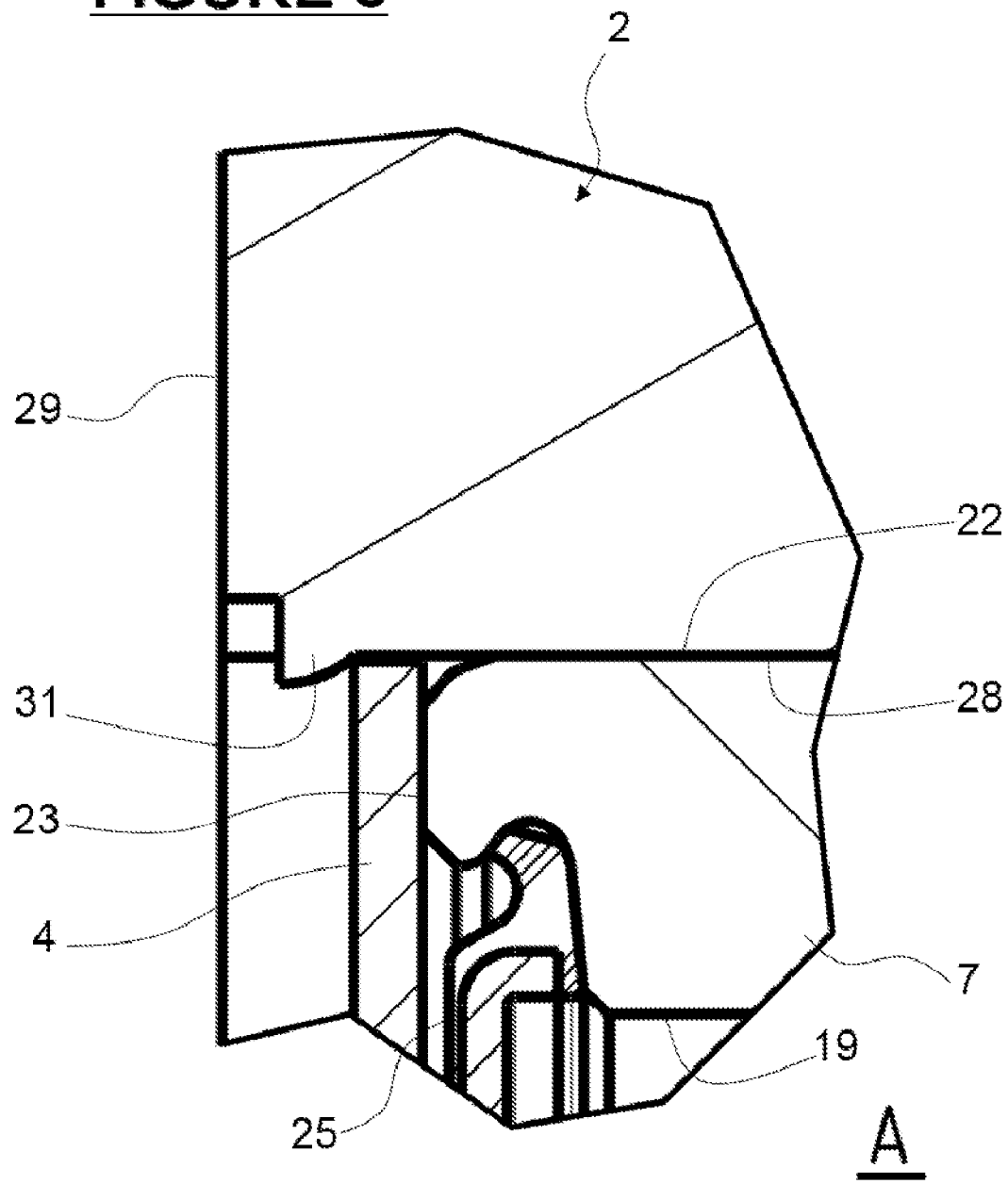
FIG. 3 is a view of detail A of the pulley device of FIG. 2.

As can be seen in FIGS. 1 and 2, a pulley device for a belt tensioning or winding roller, reference 1 overall, is of geometrical axis X1, and comprises a pulley 2 suitable for cooperating with a transmission element (not represented) such as a belt or a chain, a rolling bearing 3, and two protection flanges 4, 5.

The rolling bearing 3 comprises a fixed inner ring 6, a rotating outer ring 7, the rings 6, 7 being coaxial about the axis X1 and forming a radial space 8 between them. The rolling bearing 3 also comprises two rows of rolling elements 9 and 10, here produced in the form of balls, arranged between the rings, and cages 11 and 12 ensuring that the circumferential spacing of the rolling elements 9 and 10, respectively, is maintained.

The inner 6 and outer 7 rings are concentric. In the exemplary embodiment illustrated, the rings are solid and obtained by machining or milling with material removal from metal tubes, bars, forged parts or rolled blanks.

The inner ring 6 comprises a bore 13, an outer surface 14 of which a cylindrical portion is provided with rolling tracks 15, 16 having, in axial cross section, a concave internal profile and of toroidal form suited to the balls 9, 10, and two, rear 17 and front 18 lateral surfaces.

The bore 13 of the inner ring 6 is suitable for receiving a screw (not represented) whose body extends axially beyond the rear lateral surface 17 of the fixed inner ring 6, the body comprising a threaded portion intended to be screwed into a corresponding clamped opening of a support for the pulley device 1.

The outer ring 7 comprises a cylindrical bore 19 provided with rolling tracks 20, 21 having, in axial cross section, a concave internal profile and of toroidal form suited to the balls 9, 10, an outer cylindrical surface 22 on which the pulley 2 is mounted, and two, rear 23 and front 24 lateral surfaces.

The fixed inner ring 6 extends axially out of the rotating outer ring 7 in a rear axial direction directed towards a support on which the pulley device 1 is intended to be mounted. The rear lateral surface 17 is intended to form a bearing surface for the rolling bearing 3 against the support of the device 1.

The rolling bearing 3 advantageously comprises annular rear 25 and front 26 seals to close, on each axial side, the radial space 8 that exists between the rings 6, 7 and within which the rolling elements 9, 10 are housed.

The seals 25, 26 each advantageously comprise a first end fixed into a circumferential groove provided with a bore portion 19 of the outer ring 7, and a second end formed by a lip in sliding contact against a portion of the outer surface 14 of the inner ring 6. The radial space 8 is thus closed in an axially seal tight manner between the two seals 25, 26.

Alternatively, the rolling bearing can comprise a different number of rows of rolling elements arranged between the outer and inner rings, for example a single row of rolling elements.

Alternatively, the rolling bearing can comprise other types of rolling elements, for example tapered rollers, needles, or even cylindrical rollers.

In this embodiment, the inner ring 6 is formed in a single piece. According to an alternative embodiment that is not represented, the rolling bearing 3 can comprise an annular spacer mounted in the inner ring 6.

The pulley 2 comprises an outer cylindrical surface 27 intended to cooperate with a transmission element such as a belt or a chain, and an inner surface 28 mounted securely on the outer surface 22 of the outer ring 7. The pulley has an essentially tubular form and is centered on the central axis X1. The friction forces between the outer surface 27 and the transmission element allow the transmission of a rotational torque.

According to another embodiment that is not represented, the transmission element can be a toothed belt, particularly of Poly V type, or of any other type without that being a limitation of the present invention. The outer surface 27 is then provided with elements such as rigids or notches to collaborate with the form of the belt.

The pulley 2 further comprises rear 29 and front 30 portions axially protruding relative to the rear 23 and front 24 lateral surfaces, respectively, of the outer ring 7. In the embodiment illustrated, these axially protruding portions 29, 30 are stages.

The pulley 2 can advantageously be produced in plastic material, and preferentially polyamide, in PA6 or PA66 for example. The pulley 2 can advantageously be formed by overmoulding plastic material onto the outer ring 7 of the rolling bearing 3. The result thereon is an excellent cohesion between these parts. Alternatively, the pulley 2 can be produced in metal material, for example steel, and mounted crimped onto the outer cylindrical surface 22 of the outer ring 7. The pulley 2 can also have other forms that are optimized according to the needs of the application.

The pulley device 1 also comprises rear 4 and front 5 protection flanges mounted on either side of the sealed radial space 8. More specifically, the rear flange 4 covers the rear seal 25, and the front flange 5 covers the front seal 26 to provide preliminary protection against external pollution, in particular dust and particles.

The rear flange 4 comprises an essentially radial body extending between a bore-forming inner edge and mounted around a cylindrical portion of the outer surface 13 of the inner ring 6, and an outer edge mounted in a bore of the rear axially protruding portion 29 of the pulley 2. The rear flange 4 comes to bear against the rear lateral surface 23 of the outer ring 7.

Similarly, the front flange 5 comprises an essentially radial body extending between a bore-forming inner edge and mounted around a cylindrical portion of the outer surface 13 of the inner ring 6, and an outer edge mounted in a bore of the front axially protruding portion 30 of the pulley 2. The front flange 5 comes to bear against the front lateral surface 24 of the outer ring 7.

The flanges are formed by cutting from a sheet of metal, for example steel. Alternatively, the flanges can be made of plastic material, for example of polyamide.

According to the invention, the rear 4 and front 5 flanges are each fixed to the rotating outer ring 7 by crimping the rear 29 and front 30, respectively, axially protruding portions of the pulley 2 onto the flanges 4, 5.

More specifically, crimping portions 31 are formed by localized plastic deformations of a bore portion of the rear axially protruding portion 29. These crimping portions 31 are formed towards the outer edge of the rear flange 4. The outer edge of the rear flange 4 is thus pinched axially between these crimping portions 31 of the pulley 2 and the rear lateral face 23 of the rotating outer ring 7.

Similarly, crimping portions 32 are formed by localized plastic deformations of a bore portion of the front axially protruding portion 30. These crimping portions 30 are formed towards the outer edge of the front flange 5. The outer edge of the front flange 5 is thus pinched axially between these crimping portions 32 of the pulley 2 and the front lateral face 24 of the rotating outer ring 7.

The axially protruding portions 29, 30 of the pulley 2 are each crimped at several locations of the circumference of the outer edges of the flanges 4, 5. In the embodiment illustrated, the crimping portions 31, 32 are evenly distributed circumferentially. Alternatively, these crimping portions can have another circumferential distribution.

Particularly advantageously, the rear 4 and front 5 flanges each have a bore-forming inner edge that comes into immediate proximity of a portion of the outer surface 13 of the fixed inner ring 6. The flanges 4, 5 thus form labyrinth sealing means with the inner ring 6.

Furthermore, the technical features of the different embodiments can be, fully or just for some of them, combined with one another. Thus, the pulley device can be adapted in terms of costs, performance and simplicity of an implementation.

What is claimed is:

1. A pulley device for a tensioning or winding roller for a transmission element comprising:
    a pulley having an outer surface configured to cooperate with the transmission element,
    a rolling bearing having an outer ring, the pulley being mounted on a radially outermost axially extending surface of the outer ring, an inner ring, the inner ring having a radially innermost axially extending surface, the inner ring having a first axial end separating the radially innermost axially extending surface and the radially outermost axially extending surface, wherein
    the outer ring and the inner ring are coaxial and form a radial space between them, and at least one row of rolling elements arranged in the radial space, and
    at least one annular protection flange which, when viewed in cross-section, is entirely radial and positioned axially outside of the outer ring, the at least one annular protection flange having an end aligned in immediate proximity to the radially outermost axially extending surface of the outer ring, wherein
    the pulley provides at least one portion protruding axially relative to a lateral face formed by the first axial end of the outer ring, the flange being mounted in a bore of the axially protruding portion, the flange being fixed to the outer ring by crimping the axially protruding portion of the pulley towards an outer edge of the flange.

2. The pulley device according to claim 1, wherein the flange comes to bear directly against the lateral face of the outer ring.

3. The pulley device according to claim 1, wherein the axially protruding portion of the pulley is crimped at several locations of the circumference of the outer edge of the flange.

4. The pulley device according to claim 1, wherein the flange has a bore-forming inner edge and comes into immediate proximity of an outer surface of the inner ring.

5. The pulley device according to claim 1, further comprises front and rear sealing means closing the radial space on each axial side.

6. The pulley device according to claim 1, wherein the pulley is made of metal.

7. The pulley device according to claim 1, wherein the pulley is made of plastic material.

8. A pulley device for a tensioning or winding roller for a transmission element comprising:
    a pulley having a radially outer surface configured to cooperate with the transmission element and a radially inner surface,
    a rolling bearing having an outer ring, the pulley being mounted on a radially outermost axially extending surface of the outer ring such that the radially inner surface of the pulley contacts an outer surface of the outer ring, inner ring, the inner ring having a radially innermost axially extending surface, the inner ring having a first axial end separating the radially innermost axially extending surface and the radially outermost axially extending surface, wherein
    the outer ring and the inner ring are coaxial and form a radial space between them, and at least one row of rolling elements arranged in the radial space, and
    at least one annular protection flange with an essentially radial body, and positioned axially outside of the outer ring, the at least one annular protection flange having an end aligned in immediate proximity to the radially outermost axially extending surface of the outer ring, wherein
    the pulley provides at least one portion protruding axially relative to a lateral face formed by the first axial end of the outer ring, the flange being mounted in a bore of the axially protruding portion, the flange being fixed to the outer ring by crimping the axially protruding portion of the pulley towards an outer edge of the flange, and wherein
    other than the crimped axially protruding portion of the pulley, the flange does not extend radially outwardly past (1) the radially inner surface of the pulley and (2) the outer surface of the outer ring.

9. The pulley device according to claim 8, wherein the flange comes to bear directly against the lateral face of the outer ring.

10. The pulley device according to claim 8, wherein the axially protruding portion of the pulley is crimped at several locations of the circumference of the outer edge of the flange.

11. The pulley device according to claim 8, wherein the flange has a bore-forming inner edge and comes into immediate proximity of an outer surface of the inner ring.

12. The pulley device according to claim 8, further comprises front and rear sealing means closing the radial space on each axial side.

13. The pulley device according to claim 8, wherein the pulley is made of metal.

14. The pulley device according to claim 8, wherein the pulley is made of plastic material.

15. The pulley device according to claim 1, wherein at least one annular protection flange contacts the first axial end of the outer ring.

16. The pulley device according to claim 8, wherein at least one annular protection flange contacts the first axial end of the outer ring.

* * * * *